(12) United States Patent
Barth et al.

(10) Patent No.: US 6,663,950 B2
(45) Date of Patent: Dec. 16, 2003

(54) OPTICALLY ACTIVE FILM COMPOSITE

(75) Inventors: Steven A. Barth, Martinsville, VA (US); Anthony B. Port, Collinsville, VA (US); Coby L. Hubbard, Meadows of Dan, VA (US)

(73) Assignee: CPFilms, Inc., Martinsville, VA (US)

( * ) Notice: Subject to any disclaimer, the term of this patent is extended or adjusted under 35 U.S.C. 154(b) by 0 days.

(21) Appl. No.: 09/878,940

(22) Filed: Jun. 13, 2001

(65) Prior Publication Data

US 2002/0090507 A1 Jul. 11, 2002

Related U.S. Application Data

(63) Continuation-in-part of application No. 09/712,569, filed on Nov. 14, 2000, now abandoned.

(51) Int. Cl.$^7$ .............................. B32B 5/00; B32B 5/02; B32B 7/02; B32B 7/12; B32B 27/36; B32B 27/40
(52) U.S. Cl. .................... 428/323; 428/332; 428/336; 428/343; 428/411.1; 428/480; 428/483
(58) Field of Search ................................ 428/323, 336, 428/335, 332, 343, 402, 411.1, 412, 423.1, 480, 483

(56) References Cited

U.S. PATENT DOCUMENTS

| 4,557,980 A | | 12/1985 | Hodnett, III ................ 428/336 |
| 5,518,810 A | | 5/1996 | Nishihara et al. ........... 428/328 |
| 5,558,912 A | * | 9/1996 | Fagerburg et al. ......... 428/35.7 |
| 5,807,511 A | | 9/1998 | Kunimatsu et al. ......... 252/587 |
| 6,060,154 A | | 5/2000 | Adachi et al. .............. 428/323 |
| 6,315,848 B1 | * | 11/2001 | Kondo ........................ 156/99 |

FOREIGN PATENT DOCUMENTS

| EP | 0 727 306 A | | 8/1996 |
| EP | 0 905 100 A | | 3/1999 |
| EP | 0 943 587 A | | 9/1999 |
| EP | 0739274 | | 10/1999 |
| EP | 1008564 | | 6/2000 |
| EP | 1008564 A1 | * | 6/2000 |
| JP | 07 010599 A | | 1/1995 |
| JP | 10 101375 A | | 4/1998 |

OTHER PUBLICATIONS

Parry Moon, "Proposed Standard Solar–Radiation Curves for Engineering Use", Journal of the Franklin Institute, vol. 230, pp. 583–618 (1940).

* cited by examiner

*Primary Examiner*—D. S. Nakarani
*Assistant Examiner*—Nikolas J. Uhlir
(74) *Attorney, Agent, or Firm*—Fitzpatrick, Cella, Harper & Scinto

(57) ABSTRACT

An optically active film composite including a polymeric film substrate coated with a layer of resin having a thickness of less than 6 microns and a pencil hardness of at least 2H, and which includes 30–60% by weight of nanoparticles of ATO or ITO, and nanoparticles of a second metallic compound being an inorganic compound and absorbing light having a wavelength in the range of 700–1100 nm. The composite preferably has a VLT of at least 50% and a %TSER of at least 35% with a weighted UV absorption of less than 1%.

9 Claims, 1 Drawing Sheet

OPTICALLY ACTIVE FILM COMPOSITE

REFERENCE TO RELATED APPLICATIONS

This is a continuation-in-part application of U.S. patent application Ser. No. 09/712,569, filed Nov. 14, 2000; now abandoned.

FIELD

This invention relates to optically active transparent composites and in particular to composites used for the shielding of infrared heat energy and UV radiation.

BACKGROUND OF THE INVENTION

A conventional heat shielding transparent composite may comprise a very thin layer of a reflective metal such as silver or aluminum which is deposited on a transparent substrate by vacuum deposition, or sputtering techniques. However if such composites are utilized for the windows of buildings or vehicles the film thickness must be extremely thin to avoid high levels of reflectance and maintain a high level of visible light transmission (VLT) of at least 70%. Metallic layers are also prone to corrosion problems.

In order to avoid the above problems some film composites are coated with anti-reflective layers.

It is known that nanoparticles of various inorganic metal compounds, in particular oxides, can be dispersed within a resin binder to form coatings that reflect or absorb particular wavelength bands of infrared energy and allow high levels of transmission of visible light. In particular U.S. Pat. No. 5,807,511 discloses that antimony doped tin oxide (ATO) has a very low transmission to infrared light having a wavelength exceeding 1400 nm, and from U.S. Pat. No. 5,518,810 it is known that coatings containing tin doped indium oxide (ITO) particles also substantially block infrared light with having wavelength above 1000 nm, but the crystal structure of ITO can be modified to block light having wavelengths of down to 700–900 nm. U.S. Pat. No. 6,060,154 discloses the use of fine particles of ruthenium oxide, tantalum nitride, titanium nitride, titanium silicide, molybdenum silicide and lanthanum boride to block light in the near infrared range. It also discloses the use of a plurality of different films each selectively transmitting light.

EP-A-739272 discloses a typical transparent polymeric film having UV absorbing properties.

EP-A-1008564 discloses the use of an infrared blocking coating composition which contains both ATO or ITO, and metal hexaboride. The ATO or ITO blocks the higher wavelengths of infrared light and the hexaboride particles block the lower wavelengths of light. The coating may be applied to polymeric film substrates.

The present invention seeks to provide a thin transparent film layer having visible light transmission which shields against infrared light over a wide wave band and which is easy and economic to manufacture commercially.

STATEMENTS OF INVENTION

According to the present invention there is provided an optically active film composite including a layer of resin binder having a thickness of less than 6 microns and a pencil hardness of at least 2H, preferably 3H, and including nanoparticles of at least one metallic compound absorbing light having a wavelength in the range of 1000–2500 nm, and nanoparticles of a second metallic compound being an inorganic compound and absorbing light having a wavelength in the range of 700–1100 nm. Preferably the composite has a VLT of at least 50% and a % TSER of at least 35%, and more preferably has a VLT of at least 70%. For a composite having VLT in the range 50–60% the t TSER may be between 50–65%.

Pencil hardness is measured according to ASTM D3363-92a.

VLT is visible light transmission calculated using CIE Standard Observer (CIE 1924 1931) and D65 Daylight.

The % TSER is percentage total solar energy rejection which is calculated from optical and heat rejection properties of coated film measured on a Varian Analytical Cary 5 spectrophotometer in accordance with ASTM E903-82, the absorption and transmission data being analyzed using parameters described by Perry Moon in the Journal of the Franklin Institute Vol. 230 pp 583–618 (1940).

Nanoparticles are particles having an average particle diameter 200 nm or less, and preferably less than 100 nm.

Preferably, said one metallic compound is Antimony Tin Oxide (ATO), Indium Tin Oxide (ITO), or Tin Oxide.

Preferably said one metallic compound is ATO and the layer contains 30–60% by weight of ATO, preferably 50–60% by weight of ATO.

Said second compounds may be modified ITO as is described in U.S. Pat. No. 5,807,511 and/or at least one of a metal hexaboride taken from lanthanum series of the periodic table, the preferred hexaborides are La, Ce, Pr, Nd, Gb, Sm, and Eu with La being the most preferred option.

Said layer contains a maximum of 3% by weight of said second metallic compound, preferably less than 2%, and more preferably between 0.5%–2%. In a preferred embodiment, the weight ratio of said second compound particles to the sum of said second compound particles and said first compound particles ((Weight of 2nd compound particles/Weight of first compound particles +second compound particles) *100%) is 1.08%–3.53%, as illustrated by the data in Table 5.

The binder may be a thermoplastic resin such as an acrylic resin, a thermosetting resin such as an epoxy resin, an electron beam curing resin, or preferably a uv curable resin which may be an acrylate resin of the type disclosed in U.S. Pat. No. 4,557,980, or preferably a urethane acrylate resin.

Said layer is electrically non-conductive which makes it particularly useful for applications relating to automobile windshields or rear windows especially those containing radio aerials.

Said layer may be coated to a transparent polymeric film substrate, preferably a polyester film which is more preferably polyethyleneterephthalate (PET) film. The infrared blocking layer forms a hardcoat for the film substrate which is particularly advantageous and may cut out a further processing step during composite film manufacture. The PET film may be coated with an adhesive for fixing the film composite to for example an existing window of a building or automobile. The PET film and/or adhesive may include at least one uv radiation absorbing material to block out substantially all uv radiation to less than 1% weighted UV transmission.

Weighted UV transmission is derived from measurements made in accordance with ASTM E-424 and as modified by the Association of Industrial Metallisers, Coaters & Laminators (AIMCAL).

Such composites have low visible reflectivity of less than 10% and have excellent weatherability with no loss of absorption properties, and holding color, after 1500 hours in a Weatherometer.

The composite may further include at least one glass sheet, which may be laminated or a single sheet, to which the coated film is adhered, preferably using a pressure sensitive adhesive The coated film may be sandwiched between two glass sheets In some environments a % VLT of less than 50% may be acceptable combined with a higher heat/IR rejection properties. According to another aspect of the invention there is provided an optically active film composite including a polymeric film substrate coated with a layer of resin having a thickness of between less than 6 microns, the resin including nanoparticles of ATO, and nanoparticles of a second metallic compound being an inorganic compound and absorbing light having a wavelength in the range of 700–1100 nm, the composite having a VLT of greater than 50% and a % transmission of light at 940 nm wavelength of no more than 10%.

A further aspect of the invention provides an optically active film composite including a transparent substrate coated with a layer of resin having a thickness of less than 6 microns and containing nanoparticles of ATO, and nanoparticles of a second metallic compound being an inorganic compound and absorbing light having a wavelength in the range of 700–1100 nm, with a second transparent substrate located on said layer so that said layer is sandwiched between the two substrates.

Said substrates may be PET film or glass.

With the resin layer located within the composite the optical properties of the resin layer are stabilized and have improved weatherability.

Also according to the invention there is provided a method of manufacture of an infrared energy shielding film hard coat, wherein a dispersion of nanoparticles of at least one metal compound absorbing light in the waveband 1000–2500 nm in a solution of a polymeric resin, is mixed with a second dispersion of nanoparticles of a second metallic compound absorbing light in the waveband 700–1100 nm in a liquid compatible with said solution, the liquid mixture being coated as a thin layer on a substrate and dried to form said hard coat.

The substrate is preferably PET film whose surface may be treated for adhesion of the layer. The coated film is dried by passing under UV lamps having a rating of at least 300 watts per inch at a linear speed of at least 50 ft per min.

The liquid mixture may be applied to the film by any suitable method for example roller coating in particular using gravure printing techniques, slot die coating, bar and blade coating.

DESCRIPTION OF DRAWINGS

The invention will be described by way of examples and with reference to the accompanying drawings in which.

The invention will be described below with reference to a number of examples prepared from the following materials Composition A: a UV curable urethane acrylate solvent based coating containing about 30–40% ATO nanoparticles and supplied by Sumitomo Osaka Cement under the trade name SHI-60.

Composition B is a dispersion of 2.2% by weight of nanoparticles of an inorganic metallic compound which absorbs light in the range 700–1000 nm dispersed in toluene supplied by Sumitomo Metal Mining under the designation KHF-7S Composition C is a 25% dispersion of ATO nanoparticles in toluene supplied by Sumitomo Metal Mining under the designation FMF-3S Composition D is UV curable polyacrylate coating composition as is described in U.S. Pat. No. 4,557,980.

PET Film is 4 & 7 mil Melinex 454 surface treated PET from Dupont, 1 mil Misubishi 5000 film, and 1 mil Mitsubishi film treated with uv absorber as described in EP-A-739 274.

Preparation of IR Shielding Composites

Various coatings were prepared from the compositions A,B,C, & D by mixing selected compositions with gentle stirring. Following complete addition the mixed compositions were stirred for a further 30 minutes.

The different coating formulations were applied to PET films by using wire wound rods (Myers rods) of different sizes to deposit a range of different thickness coatings on the PET film. The coated films were dried on a glass plate for 1 minute at 70 degrees centigrade and the coating cured under UV 300 Watt per inch lamps on a laboratory belt moving at 50 feet per minute.

The different formulations were tested for % VLT, % TSER and pencil hardness as described above.

Various samples were tested for Haze using a Hunter Laboratories Ultrascan XE and calculated according to:

(Diffuse Transmittance/Total Transmittance)×100 over a light range of 380–780 nm.

Samples were also tested for Abrasion resistance (Abrasn.) using a Taber Abrader in accordance with ASTM D1044-93. Results are quoted as an increase in Haze after 100 cycles using CS10 wheels each loaded with 1 kg.

Figure 1:
FIG. 1 is a schematic drawing of a first composite according to the present drawings.

A number of composite samples as shown in FIG. 1 were prepared as described. FIG. 1 shows a composite 10 having a layer 11 of various formulations coated onto a PET substrate 12.

EXAMPLE 1

Example 1 comprises control samples outside of the present invention and is for reference only. Formulations comprising different ratios by weight of C & D were prepared by the addition of D to C, and coated onto 7 mil (175 microns) PET film. The optical properties of the various films are given in table 1 below.

TABLE 1

| Sample No. | ratio of C:D | Myers rod # | DFT* | % VLT | % TSER | % Haze |
|---|---|---|---|---|---|---|
| 1 | 1:1 | 8 | 7.3 | 87 | 17 | 1.1 |
| 2 | 4:1 | 8 | 4.6 | 83 | 22 | 0.8 |
| 3 | 5:1 | 8 | 4.3 | 81.5 | 24.7 | 1.1 |
| 4 | 6:1 | 8 | 4.0 | 79 | 25 | — |
| Film | | | | 86 | 16 | 0.8 |

*DFT dry coating thickness in microns

The results in Table 1 demonstrate what is known from the prior art that is that it is possible to incorporate high loadings of ATO into a binder and still maintain a high % VLT and low haze levels. The % TSER is only moderate.

EXAMPLE 2

Example 2 comprises control samples in which composition A was coated onto 4 mil (100 microns) PET film for different layer thicknesses. The optical properties of the different thickness samples are shown in Table 2 below.

TABLE 2

| Sample No. | Myers Rod # | DFT | % VLT | % TSER | % Haze |
|---|---|---|---|---|---|
| 5 | 4 | 3.1 | 84 | 19.9 | 1.2 |
| 6 | 6 | 4.6 | 82 | 23.4 | 0.9 |
| 7 | 8 | 6.2 | 79 | 27.8 | 0.9 |
| 8 | 10 | 7.7 | 80 | 26.1 | 0.8 |
| Film | | | 87 | 10.0 | 0.8 |

The results in Table 2 also demonstrate that for high levels of ATO the increase in film thickness does not necessarily have a proportionate effect on solar energy rejection (% TSER). The film clarity (% VLT) and haze levels are maintained but only moderate levels of solar rejection are possible.

EXAMPLE 3

Example 3 comprises control samples for formulations of B and D which are outside of the present invention. Different formulations were prepared by mixing D into B and the various formulations were coated onto 7 mil (175 micron) PET film. The optical properties are given in Table 3 below:

TABLE 3

| Sample No | Ratio B:D by wt. | added Toluene pbr* | Myers Rod# | DFT | % VLT | % TSER | % Haze |
|---|---|---|---|---|---|---|---|
| 9 | 1:1 | 0 | 8 | 5.5 | 67 | 41 | 2.6 |
| 10 | 1:1 | 1 | 8 | 3.7 | 79 | 27 | 2.1 |
| Film | | | | | 86 | 16 | 0.8 |

*parts by weight resin

The data shows that the addition of B to D results in unacceptable levels of % VLT and haze, but for thicker coatings produces a suitable % TSER.

EXAMPLE 4

Example 4 comprises control samples that fall outside the scope of the present invention. D was mixed into a mixture of B & C for various formulations of B, C and D which were coated onto 4 mil (100 microns) PET and the resulting optical properties are given in Table 4 below:

TABLE 4

| Sample No. | Ratio D:C:B by wt. | Myers Rod # | DFT | % VLT | % TSER | % Haze | Abrasn. |
|---|---|---|---|---|---|---|---|
| 11 | 1:4:1 | 4 | 2 | 86.5 | 19.9 | 0.9 | — |
| | | 6 | 3 | 83 | 26.2 | 0.9 | — |
| | | 8 | 4 | 78.6 | 32.7 | 1.0 | — |
| | | 10 | 5 | 78.6 | 31.6 | 1.0 | — |
| 12 | 1.5:5.5:1 | 8 | 4 | 81.5 | 24.8 | 1.6 | 21 |
| | | 10 | 5 | 80.5 | 27.4 | 1.6 | 21 |
| | | 12 | 6 | 76.5 | 32.0 | 1.7 | 15 |
| | | 14 | 7 | 74.8 | 33.7 | 1.7 | 14 |
| 13 | 2:5.5:1 | 8 | 5 | 81.5 | 25.5 | 1.6 | 11 |
| | | 10 | 6 | 80.5 | 24.8 | 1.7 | 11 |
| | | 12 | 7 | 76.5 | 31.2 | 1.8 | 9 |
| | | 14 | 8 | 74.8 | 33.2 | 1.7 | 9 |
| 14 | 1:0:0 | 6 | 3 | 88.0 | 18 | 0.8 | 8 |
| Film | | | | 87.0 | 10 | 0.8 | — |

The results demonstrate that the simple addition of B and C to the resin binder D to approach both optimum light transmission (% VLT) and energy rejection (% TSER) produced films with unacceptable abrasion resistance (sample 12). The addition more compound D to increase abrasion resistance resulted in coatings which are uneconomically thick (sample 13) requiring excessive material and processing requirements Sample 14 demonstrates an acceptable level of abrasion resistance.

EXAMPLE 5

Example 5 comprises samples according to the present invention. Various formulations of A:B were made by addition of B into A and coated onto 1 mil (25 microns) PET film. The resultant optical properties are given in Table 5 below:

TABLE 5

| Sample No. | Ratio A:B by wt | Myers Rod# | DFT | % VLT | % TSER | % Haze | Abrasn. |
|---|---|---|---|---|---|---|---|
| 15 | 5:1 | 10 | 6.0 | 73.2 | 34.9 | 1.8 | — |
| 16 | 5:2 | 6 | 3.1 | 78.2 | 31.8 | 1.8 | 8.9 |
| | | 7 | 3.7 | 73.3 | 39.3 | 1.8 | 8.6 |
| | | 8 | 4.1 | 72.1 | 39.1 | 1.8 | 8.4 |
| | | 9 | 4.7 | 74.1 | 36.4 | 1.9 | 8.2 |
| | | 10 | 5.1 | 66.6 | 48.6 | 1.9 | 9.8 |
| 17* | 5:2 | 6 | 3.1 | 77.0 | 32.6 | 3.0 | 12.1 |
| | | 7 | 3.7 | 72.6 | 38.3 | 3.0 | 9.2 |
| | | 8 | 4.1 | 68.9 | 42.2 | 3.2 | 9.2 |
| | | 9 | 4.7 | 65.7 | 47.8 | 3.2 | 9.4 |
| | | 10 | 5.1 | 62.9 | 47.8 | 3.3 | 10.4 |
| 18 | 5:2.5 | 6 | 2.9 | 71.6 | 38.7 | 2.9 | 6.8 |
| | | 8 | 3.8 | 66.6 | 43.4 | 2.8 | 7.7 |
| 19* | 5:2.5 | 4 | 1.9 | 78.3 | 32.4 | 2.9 | 16 |
| | | 6 | 2.9 | 71.7 | 39.3 | 3.5 | 8.8 |
| | | 7 | 3.4 | 68.3 | 44.1 | 3.5 | 8.8 |
| | | 8 | 3.8 | 67.2 | 44 | 3.1 | 9.1 |
| Film | | | | 88 | 9.9 | 1.9 | |
| Film* | | | | 87.5 | 14.0 | 3.0 | |

Film* is PET film containing UV absorbing material as described in EP-A-739274.

The results show that by mixing B into a solution of resin binder containing ATO then it is possible to achieve the desired optimised optical and heat rejection properties of 70–75% VLT, 35–40% TSER with good abrasion resistance, and acceptable haze, for coatings having a commercially acceptable thickness of upto 6 microns.

Pencil Hardness values were 3H.

EXAMPLE 6

The film thickness values (DFT) in the tables above were calculated from the volume solid contents of the coatings and the approximate wet film thicknesses applied by the different Myers rods. The calculated DFT is only a guide to the actual film thicknesses takes no account of sample variation or resin shrinkage on curing and drying which may be 10–30%.

Further samples of the formulation 19* from Table 5 above were taken and coated on 1 mil PET film and tested. The actual film thicknesses were measured (Measured DFT) optically using interference fringes in the IR specta in the range 1500 to 2000 nm and also by using scanning electron microscopy (SEM). The results are given in table 6 below:

TABLE 6

| Myers rod | Calc DFT | Measured Opt. | DFT(μ) SEM | % VLT | % TSER | % Haze | Abr. |
|---|---|---|---|---|---|---|---|
| 4 | 1.9 | 1.51 | 1.31 | 78.9 | 29.1 | 3.44 | 13 |
|   |     | 1.78 | 1.41 | 76.6 | 32.0 | 3.1  | 11 |
| 6 | 2.8 | 2.57 | 2.24 | 74.8 | 36.9 | 2.89 | 9 |
|   |     | 2.62 | 2.43 | 72.6 | 39.6 | 3.1  | 9 |
| 7 | 3.3 | 2.91 | —    | 72.8 | 39.3 | 3.22 | 9 |
|   |     | 3.16 | 2.76 | 70.00| 41.8 | 3.2  | 9 |
| 8 | 3.7 | 3.46 | 2.85 | 70.8 | 46.3 | 3.17 | 10 |
|   |     | 3.29 | 3.19 | 67.9 | 45.7 | 3.1  | 10 |

EXAMPLE 7

Large scale continuous web coating trials were performed using the sample formulation 17* from Table 5. In the trials the coating was applied using a gravure cylinder and the coating dries at 150° F. and UV cured at a line speed of 60 feet per minute, on either a 72 inch wide or 24 inch wide coating lines. The results of the trials are given in Table 7 below;

TABLE 7

| Run | Calc. DFT | Measured Opt. | DFT SEM | % VLT | % TSER | % Haze | Abr. |
|---|---|---|---|---|---|---|---|
| 1 | — | 2.34 | 2.04 | 72.8 | 37.9 | 2.2 | 9 ± 1 |
| 2 | — | 2.11 | 1.83 | 71.9 | 36.7 | 3.9 | 9 ± 1 |
| 3 | — | 2.10 | 1.92 | 72.0 | 37.7 | 3.7 | 9 ± 1 |
| 4 | — | 2.07 | 1.81 | 73.1 | 37.0 | 3.7 | 9 ± 1 |
| 5 | — | 1.68 | 1.54 | 74.1 | 36.0 | 3.7 | 9 ± 1 |
| 6 | 2.2 | — | 1.67 | 72.5 | 37.85 | 3.7 | 9 ± 1 |

The results given in Tables 6 & 7 show that coating prepared from the formulations 17 and 19 have the optimised properties of 70–75% VLT and 35–40% TSER with acceptable abrasion resistance (less than 12%) with coatings having measured thicknesses of between 1–2 microns. The high haze levels are due to the UV absorber in the film The properties of any optically active film composite are necessarily an optimization between sometimes competing properties. For example, as demonstrated in Table 3, the simple mixing of B into a hardcoat formulation D produced either an adequate % VLT or % TSER but not both and haze was unacceptable.

The simple mixing of B & C into the hardcoat formulation D as shown in Table 4, produced suitable % VLT and % TSER properties only when the infrared blocking layer was unacceptably thick for commercial processing and produced a layer having poor abrasion resistance.

It is therefore surprising that the simple admixture of B to A resulted in a infrared blocking layer having all the required optimized properties necessary for commercially produced film.

Figure 2:
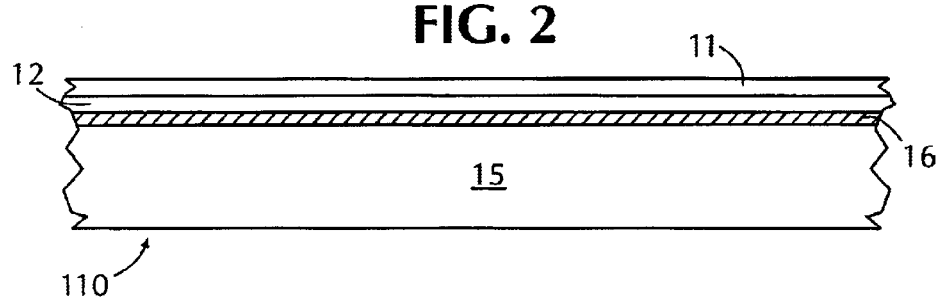
FIG. 2 is a schematic drawing of a second composite according to the present invention.

As is shown in FIG. 2, a second embodiment of the invention comprises a composite 110 includes a laminate 14 of PET film 12 with a hardcoat 11 formed from formulations of A & B. The film 12 is adhered to glass sheet 15 by an adhesive layer 16.

EXAMPLE 8

The sample formulations 16 & 17 from Table 5 were applied using a Myers Rod No. 8 to 1 mil (25 micron) PET film which was adhered to 0.125 in (3 mm) thick glass panels using a proprietary pressure sensitive adhesive containing a uv absorber, for example Solutia product Gelva 263 with added uv absorber. The adhesive layer has a thickness of about 6–10 microns. Other samples were prepared using laminated glass, typically used for automobile wind screens and windows. The prepared samples were tested for optical properties and these are given in the Table 8 below:

TABLE 8

| Sample No. | Glass | ST % | SR % | SA % | % VLT | % TSER | % Haze | uv# |
|---|---|---|---|---|---|---|---|---|
| 16 | 1/8 | 45.8 | 7.1 | 47.1 | 72 | 40.9 | 1.6 | |
|    | lam | 45.0 | 7.4 | 47.6 | 71.4 | 41.8 | 2.0 | |
| 17* | 1/8 | 45.0 | 7.0 | 48.0 | 70.4 | 41.5 | 1.6 | 0.09 |
|    | lam | 44.9 | 7.4 | 47.8 | 71.6 | 41.9 | 2.2 | 0.01 | weighted uv % transmission
*indicates the PET film contains a UV absorber
ST is solar transmission, SR solar reflection and SA solar absorption.

The results show that a composite comprising the formulation A & B with PET film and glass provides high levels of solar energy rejection with good visible light transmission and low haze. The low haze results in 17* are due to a reduction in surface scattering when the UV absorber film is laminated to glass. The combination of composite which included PET with the uv absorber removes both UV and IR radiation.

Figure 3:
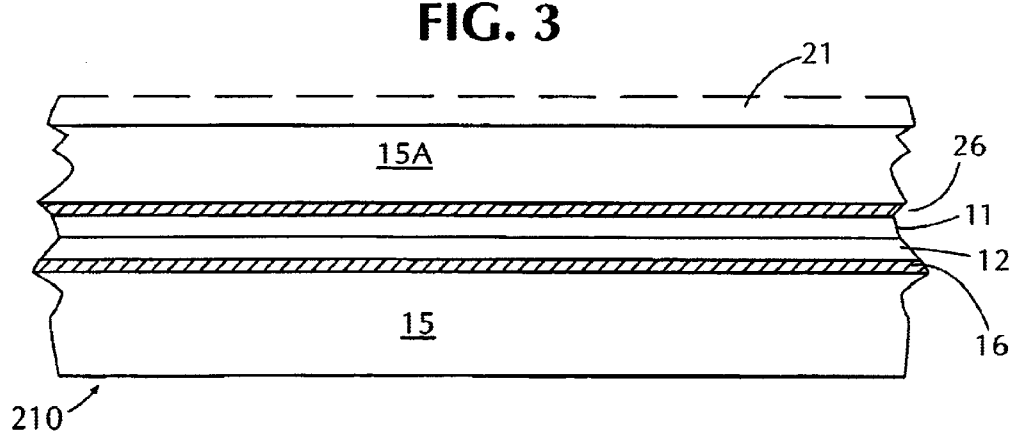
FIG. 3 is a schematic drawing of a third composite according to the present invention.

Another composite 210 according to the invention is shown in FIG. 3 which is similar to the composite of FIG. 2 with a further glass sheet 15A adhered to the cured infra red blocking layer 11 through a second layer of adhesive 26. The infrared blocking coating 11 is therefore sandwiched between the two glass plates 15 & 15A.

Either or both of the glass plates may be laminated, or may be replaced by a transparent polymeric substrate. Any polymeric film substrate and adhesive used in the composite may contain a uv absorber if desired. Where the exposed upper layer 15A comprises PET it may be optionally coated by a protective hardcoat or anti-scratch layer 211

For some applications it is desirable and acceptable that the film composites have a higher % TSER and a lower % VLT properties. For example solar control films used on side and rear windows of automobiles are required to have a % VLT greater than 50% whilst maximising solar energy rejection. In other end uses it may be desirable to maximise the blocking of infra red radiation close to the visible range whilst maintaining a high % VLT. In particular the blocking of radiation in the range 800–1000 nm to less than 10% transmission whilst maintaining a % VLT of greater than 50% has been difficult to achieve. Suitable formulations are disclosed in Example 9 below.

EXAMPLE 9

In example 9 material B was mixed with material D, material A, and/or material C to produce various formulations that achieve high blocking of near IR radiation at 940 nm, whilst having a greater than 50% VLT.

TABLE 9

| Sample no | Ratio by wt. A:B:C:D | Myres Rod | DFT μ | % VLT | % TSER | % Haze | % Trans |
|---|---|---|---|---|---|---|---|
| 20 | 0:2:0:1 | 4 | 1.85 | 64.7 | 45.5 | 3.07 | 16.2 |
|    |         | 6 | 2.77 | 58.4 | 50.9 | 3.43 | 8.12 |
|    |         | 8 | 3.69 | 43.6 | 56.2 | 5.52 | 3.67 |

TABLE 9-continued

| Sample no | Ratio by wt. A:B:C:D | Myres Rod | DFT μ | % VLT | % TSER | % Haze | % Trans |
|---|---|---|---|---|---|---|---|
| 21A | 0:3.1:1.6:0 | 8 | 2.76 | 54.9 | | 1.33 | 6.7 |
| 21B | 0:3.1:1.8:1 | 8 | 2.76 | 54.6 | | 1.34 | 7.36 |
| 21C | 0:3.1:2.0:1 | 8 | 2.76 | 56.8 | | 1.10 | 8.29 |
| 21D | 0:3.1:1.4:1 | 8 | 2.77 | 54.8 | | 1.3 | 6.59 |
| 21E | 0:1.9:1:0.24 | 8 | 1.83 | 56.2 | 52.8 | 1.13 | 5.69 |
| 21F | 0:2.5:2.6:1 | 8 | 2.75 | 58.2 | | 1.14 | 7.07 |
| 22 | 1:1:0:0 | 6 | 2.11 | 61.6 | 50.8 | 1.57 | 11.00 |
| | | 8 | 2.81 | 52.9 | 54.9 | 1.69 | 6.55 |
| | | 10 | 3.52 | 46.9 | 58.9 | 1.81 | 3.14 |

It can be seen that the formulations containing material B (the near IR absorbing nanoparticle dispersion) when mixed with either A or C (containing ATO nanoparticles) and D produce formulations that have % VLT greater than 50% and transmissions at 940 nm of less than 10%, with acceptable haze properties.

What is claimed is:

1. An optically active film composite comprising a transparent polymeric film substrate having a UV-absorbing material and a hardcoat layer with a thickness of less than 6 microns and a pencil hardness of at least 2H, said hardcoat layer comprising a resin binder including 50–60% by weight of antimony tin oxide nanoparticles for absorbing light having a wavelength in the range of 1000–2500 nm, and 0.5–2% by weight of LaB6 nanoparticles for absorbing light having a wavelength in the range of 700–1100 nm, the weight ratio of LaB6 and antimony tin oxide being such that weight of LaB6:weight of (LaB6+antimony tin oxide)×100 is in the range of 1.08–3.53%, the composite having a visible light transmission of at least 70% and % total solar energy rejection of at least 35%.

2. A composite as claimed in claim 1 wherein the resin binder is a uv curable resin binder.

3. A composite as claimed in claim 2, wherein the resin binder is a urethane acrylate resin.

4. A composite as claimed in claim 1 wherein the film substrate has adhesive on at least one side thereof and said adhesive contains at least one uv absorbing material.

5. A composite as claimed in claim 1 wherein said film substrate is a polyester film.

6. A composite as claimed in claim 1, wherein the composite further includes at least one glass sheet to which the coated film is adhered.

7. A composite as claimed in claim 6 and further including a second glass sheet located on the other side of the coated film to said one glass sheet such that the coated film is sandwiched between the two glass sheets.

8. A composite as claimed in claim 1 further comprising a second transparent polymeric film substrate located on said hardcoat layer so that said hardcover layer is sandwiched between the two substrates.

9. A composite as claimed in claim 8 wherein the second transparent film substrate is adhered to said hardcoat layer.

* * * * *

UNITED STATES PATENT AND TRADEMARK OFFICE
CERTIFICATE OF CORRECTION

PATENT NO.    : 6,663,950 B2
DATED         : December 16, 2003
INVENTOR(S)   : Steven A. Barth et al.

It is certified that error appears in the above-identified patent and that said Letters Patent is hereby corrected as shown below:

Column 2,
Line 2, "Preferably" should read -- ¶ Preferably --;
Line 4, "t" should read -- % --;
Line 20, close up right margin; and
Line 21, close up left margin.

Column 3,
Line 4, "adhesive" should read -- adhesive. --; and
Line 5, "sheets" should read -- sheets. --.

Column 4,
Line 28, "Haze" should read -- haze --;
Line 33, "Abrasion" should read -- abrasion --;
Line 35, "Haze" should read -- haze --; and
Line 47, "table 1" should read -- Table 1 --.

Column 6,
Line 3, "addition," should read -- addition of --; and
Line 6, "requirements" should read -- requirements. --

Column 7,
Line 40, "film" should read -- film.--; and
Line 53, "a" should read -- an --.

Column 8,
Line 30, "infra" should read -- infra --.

Column 9,
Line 28, "LaB6" should read -- $LaB_6$ --.

UNITED STATES PATENT AND TRADEMARK OFFICE
CERTIFICATE OF CORRECTION

PATENT NO. : 6,663,950 B2
DATED : December 16, 2003
INVENTOR(S) : Steven A. Barth et al.

It is certified that error appears in the above-identified patent and that said Letters Patent is hereby corrected as shown below:

Column 10,
Line 1, "LaB6" should read -- $LaB_6$ --.
Line 2, "LaB6:weight" should read -- $LaB_6$:weight --;
  "$LaB_6$+antimony" should read -- $LaB_6$+antimony --; and
Line 24, "hardcover" should read -- hardcoat --.

Signed and Sealed this

Sixth Day of July, 2004

JON W. DUDAS
*Acting Director of the United States Patent and Trademark Office*